Oct. 17, 1950  W. D. FOWLER  2,526,019

RELIEF VALVE

Filed Sept. 18, 1945

INVENTOR.
WILLIAM DOUGLAS FOWLER
BY Hazard & Miller
Attorneys

Patented Oct. 17, 1950

2,526,019

UNITED STATES PATENT OFFICE 2,526,019

RELIEF VALVE

William Douglas Fowler, Bakersfield, Calif.

Application September 18, 1945, Serial No. 616,983

10 Claims. (Cl. 137—53)

This invention relates to improvements in relief valves and the like. It has been primarily designed for use upon oil storage tanks where changes of ambient temperatures bring about pressure changes within the tank and consequently the invention will be described in conjunction therewith although it may be employed wherever there are similar or analogous conditions.

In storing oil in storage tanks increase in temperatures create increases in internal pressures and conversely a decrease in temperature will bring about a negative pressure condition within the tank. These pressure changes while relatively small are nevertheless effective over the entire interior surface of the tank and cannot be permitted to become very high without the tank rupturing or becoming badly distorted. The objection to the conventional type of relief valve for this purpose resides in the fact that moisture may collect adjacent the relief valve closure and freeze in subfreezing weather conditions. Also dust may collect adjacent the valve closure and its seat and this dust combined with oil may cause the closure to stick so that it will not instantly operate whenever there is a pressure differential between the exterior and the interior of the tank. In view of the fact that only a slight pressure differential between the exterior and the interior of the tank may result in serious consequences it is of the greatest importance that the relief valve be freed for immediate operation as soon as the pressure differential occurs, regardless of the presence of any surrounding frozen moisture or dust or dirt that would otherwise tend to cause the valve to stick.

A primary object of the present invention, therefore, is to provide an improved relief valve which will automatically and positively free itself for operation upon only a slight pressure differential occurring so that it will function properly regardless of conditions tending to stick or freeze the valve closure to its seat.

More specifically an object of the invention is to provide an improved relief valve consisting of a seat, a closure therefor, and a diaphragm having portions adjacent its edges interposed between the opposed or seating surfaces of the closure and seat which diaphragm is suspended from the closure and which is subject on opposite sides to any pressure differential that the interior and exterior of the tank are subjected and which, when subjected to a pressure differential be distorted to cause its edge portions to move transversely with respect to the seat surfaces to produce a wiping action and thus free the closure regardless of the circumstances or conditions tending to stick or seal the closure in closed position.

With the foregoing and other objects in view, which will be made manifest in the following detailed description and specifically pointed out in the appended claims, reference is had to the accompanying drawings for an illustrative embodiment of the invention, wherein:

Figs. 3 to 10 inclusive are partial views illustrating in plan and cross section various forms of diaphragm formations which may be advantageously used in conjunction with the improved valve.

Figure 1:
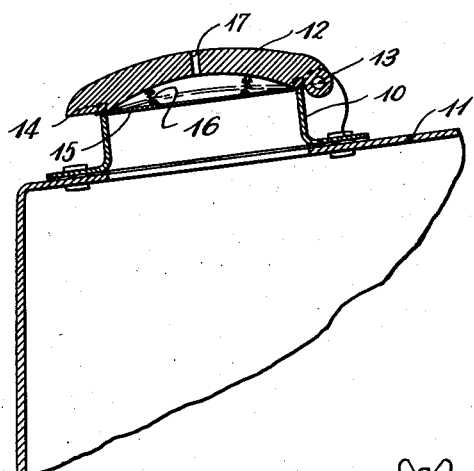
Figure 1 is a partial view in vertical section illustrating a tank on which one form of relief valve embodying the present invention has been installed.

Referring to the accompanying drawings, wherein similar reference characters designate similar parts throughout, the improved relief valve as illustrated in its simplified form in Fig. 1 consists of a suitable seat 10 suitably mounted on top of a tank or similar vessel 11. A closure 12 is movable toward and away from the seat and in the illustration is hingedly mounted thereon as indicated at 13. It may be equipped with a gasket or the equivalent indicated at 14 although such gasket is not essential to the present invention.

On the underside of the closure there is suspended a thin and readily deformable diaphragm 15 which has its outer edges extending outwardly so as to be disposed between the opposed seating surfaces of the valve seat and valve closure. This diaphragm may be suspended from the closure such as by small suspension springs 16. An aperture 17 through the closure conducts atmospheric pressure to the upper side of the diaphragm while the underside of the diaphragm is exposed to pressures existing within the tank 11.

The operation of the above described construction is substantially as follows: If pressures within the tank exceed atmospheric pressures and the valve closure 12 has become stuck for any reason the pressure differential is effective on the diaphragm to bulge the diaphragm upwardly as indicated by dotted lines on Fig. 1. This upward bulging or deforming of the diaphragm causes its edge portions to be drawn inwardly with great mechanical advantage and although the inward movements of these edge portions may be very small their wiping action with respect to the seating surfaces is adequate to free or relieve the valve closure 12 from the seat 10 and permit the escape of gases or pressure within the tank.

Figure 2:
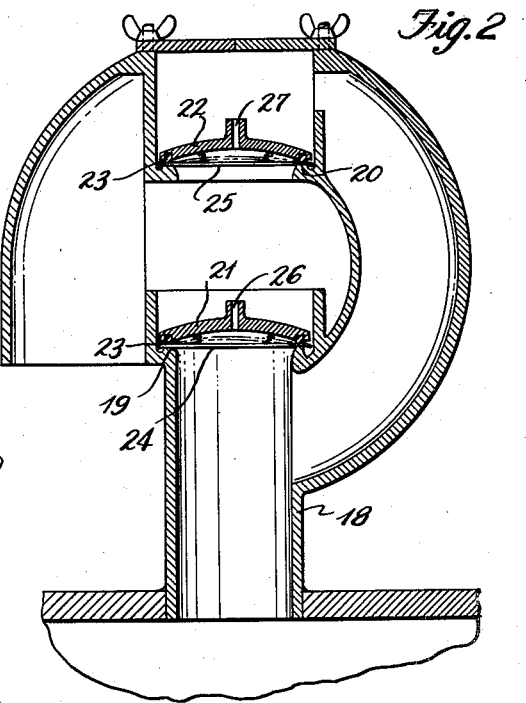
Fig. 2 is a vertical section through an alternative form of relief valve embodying the present invention.
Figures 3, 4:
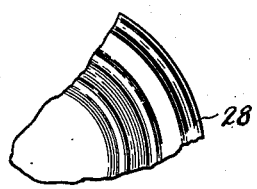
Figures 5, 6:
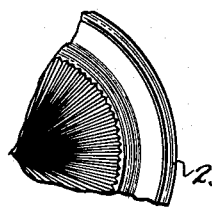
Figures 7, 8:
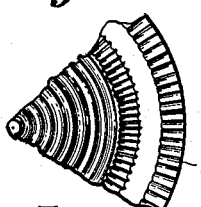

In Fig. 2 there is illustrated a relief valve embodying the present invention which is designed to protect a tank when internal pressures are either materially greater or materially less than atmospheric pressures. In this form of construction there is a goose neck 18 which provides two seats 19 and 20. A closure 21 is adapted to close toward the seat 19 and in a similar manner a closure 22 is adapted to close against the seat 20. Both of these closures may carry gaskets 23. The lower closure 21 carries a spring suspended diaphragm 24 interposed between closure 21 and seat 19 and in a similar manner the closure 22 carries a spring suspended diaphragm 25. Apertures 26 and 27 are formed in the two closures respectively.

In this form of construction if the pressure within the tank exceeds atmospheric pressures this pressure differential is effective to bulge the lower diaphragm 24 upwardly to free the lower closure 21. When the closure is thus freed it may lift and thus permit the escape of excessive internal pressures. Similarly if the pressure within the tank falls below atmospheric pressures the atmospheric pressure will be effective on the underside of diaphragm 25 to bulge this diaphragm upwardly and thus free closure 22. This closure may then lift to admit atmospheric pressure to the goose neck and thus reestablish equilibrium between the interior and the exterior of the tank. It will, of course, be appreciated that when pressure in the tank exceeds atmospheric pressure that diaphragm 25 will be bulged downwardly. This action of the diaphragm is merely an idle action but may tend to keep the seating surfaces between the closure and seat wiped free and held against sticking.

Figure 9:
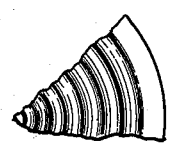
Figure 10:

The particular form of diaphragm used is optional insofar as the present invention is concerned. It may be corrugated in any one of a number of different manners as illustrated in Figs. 3 to 10. Thus there may be radial or circular corrugations or combinations of these. When the diaphragm is corrugated it is advisable to have some corrugations outwardly of the seating surfaces such as are indicated at 28 and 29 on Figs. 4 and 6. As illustrated on Figs. 7 and 8 there may be radial corrugations outwardly of the seating surfaces such radial corrugations being indicated at 30. In the form as illustrated in Figs. 9 and 10 there may be merely flat diaphragm portions between the seating surfaces with circular corrugations inwardly therefrom which tend to stiffen the diaphragm as it is made of extremely thin material. Where there are corrugations disposed outwardly of the seating surfaces such as those indicated at 28, 29 and 30, these corrugations function somewhat as cams on distortion of their diaphragms and tend to pry or cam the closure from its seat in addition to wiping between the opposed seating surfaces.

From the above-described constructions it will be appreciated that the pressure differential when utilized to deform the diaphragm which wipes and/or cams the closure frees the valve closure regardless of any circumstances or tendency to stick. While the movement of the diaphragm is small this movement is performed with great mechanical advantage to break any seal even though it may be frozen. Whenever the closure is lifted from its seat or opened it carries the diaphragm with it and when the closure subsequently closes or seats the diaphragm is again repositioned between the closure and its seat for a subsequent operation.

Various changes may be made in the details of construction without departing from the spirit and scope of the invention as defined by the appended claims.

I claim:

1. A relief valve having a seat, a rigid closure therefor having portions opposite the seat, and a flexible non-stretchable diaphragm mounted upon the closure for bodily movement toward the closure and extending between the opposed surfaces of the closure and the seat and adapted to be clamped therebetween, there being a passage through the closure whereby a differential between pressures on opposite sides of the diaphragm will be effective to distort it and cause it to wipe between the opposed surfaces of the closure and seat to free the closure for opening movement.

2. A relief valve having a seat, a rigid closure therefor, imperforate non-stretchable means interposed between the opposed surfaces of the closure and seat bodily movable toward and away from the closure for wiping said surfaces to free the closure operable by a differential in pressures on opposite sides thereof.

3. A relief valve having a seat, a closure adapted to seat toward the seat, an imperforate flexible metallic diaphragm having edge portions interposed between the closure and the seat to form an airtight seal when on said seat, and means for movably suspending said diaphragm from the closure, said closure having an aperture therethrough permitting the diaphragm to be exposed to a differential in pressures on opposite sides of the diaphragm to distort the diaphragm and cause it to move its edge portions between the closure and seat with a wiping action.

4. A relief valve having a seat, a closure adapted to seat toward the seat, a flexible diaphragm having edge portions interposed between the closure and the seat, and means for suspending said diaphragm from the closure, said closure having an aperture therethrough permitting the diaphragm to be exposed to a differential in pressures on opposite sides of the diaphragm to distort the diaphragm and cause it to move its edge portions between the closure and seat with a wiping action, there being cam surfaces on the diaphragm outwardly of the seat closely adjacent the sealing surfaces of the closure and the seat so as to be drawn between the closure and seat when the diaphragm is distorted a predetermined amount.

5. A relief valve having a seat, a closure adapted to seat toward the seat, a flexible diaphragm having edge portions interposed between the closure and the seat, and means for suspending said diaphragm from the closure, said closure having an aperture therethrough permitting the diaphragm to be exposed to a differential in pressures on opposite sides of the diaphragm to distort the diaphragm and cause it to move its edge portions between the closure and seat with a wiping action, said diaphragm having corrugations close the sealing surfaces of the closure and the seat so as to be drawn between the closure and seat when the diaphragm is distorted a predetermined amount.

6. A relief valve having a seat, a closure adapted to seat toward the seat having edge portions opposite the seat, and a flexible diaphragm interposed between the closure and the seat, means movably supporting the diaphragm from the closure permitting the whole diaphragm to flex, the diaphrgam adapted to be distorted by pressure on one side of the seat and by such distortion to move radially between the opposed surfaces of the closure and the seat so as to free the closure.

7. A relief valve having a seat, a rigid closure, a gasket for the closure opposite the seat, said closure adapted to seat toward the seat, and a flexible diaphragm interposed between the gasket and the seat and so supported from the closure that the middle thereof is movable relative to the closure and the seat when the diaphragm is distorted, said closure having an aperture therethrough permitting the diaphragm to be exposed to differential in pressures on opposite sides of the diaphragm to distort the diaphragm, said diaphragm having corrugations close to the sealing edges of the gasket and seat so that when the diaphragm is distorted a predetermined amount, the corrugations will be drawn between the gasket and the seat to positively pry them apart.

8. A relief valve having a seat, a closure adapted to seat toward the seat, and a flexible diaphragm interposed between the closure and the seat so movably supported from the closure that the whole diaphragm may flex when distorted, said diaphragm when on said seat forming an airtight seal and being distortable by difference in pressure on opposite sides thereof to draw the portions thereof between the seat and closure relative to the seat and closure to wipe the surfaces of the seat and closure so as to free the closure.

9. A relief valve having a seat, a closure adapted to seat toward the seat, a flexible diaphragm interposed between the closure and the seat, at least one resilient member movably supporting the diaphragm from the closure permitting the whole diaphragm to flex when the diaphragm is distorted, the diaphragm adapted to be distorted by pressure on one side of the seat and by such distortion to move radially between the opposite surfaces of the closure and the seat so as to free the closure.

10. A relief valve having a seat, a closure adapted to seat toward the seat, a flexible diaphragm interposed between the closure and the seat, at least one tension spring connected to the closure and the diaphragm for suspending the diaphragm from the closure and permitting the whole diaphragm to flex when the diaphragm is distorted, the diaphragm adapted to be distorted by pressure on one side of the seat and by such distortion to move radially between the opposed surfaces of the closure and seat so as to free the closure.

WILLIAM DOUGLAS FOWLER.

REFERENCES CITED

The following references are of record in the file of this patent:

UNITED STATES PATENTS

| Number | Name | Date |
| --- | --- | --- |
| 73,038 | Pollard | Jan. 7, 1868 |
| 1,211,877 | Quinn | Jan. 9, 1917 |
| 1,245,516 | Scheelk | Nov. 6, 1917 |
| 1,410,205 | Madigan | Mar. 21, 1922 |
| 1,735,888 | Baker | Nov. 19, 1929 |
| 2,101,991 | Finley | Dec. 14, 1937 |
| 2,110,691 | Aikman | Mar. 8, 1938 |